March 12, 1968        H. D. WIND        3,372,950

CONNECTING APPARATUS

Filed Aug. 10, 1966

PRIOR CONSTRUCTION

INVENTOR.
HAROLD D. WIND
BY
ATTORNEYS

United States Patent Office 3,372,950
Patented Mar. 12, 1968

3,372,950
CONNECTING APPARATUS
Harold D. Wind, Grand Rapids, Mich., assignor to Lescoa, Inc., Grand Rapids, Mich., a corporation of Michigan
Filed Aug. 10, 1966, Ser. No. 571,622
4 Claims. (Cl. 287—53)

ABSTRACT OF THE DISCLOSURE

A connecting apparatus having a knob, a generally L-shaped spring and a shaft, one of said legs of said spring mounted within said knob and the other of said legs lying proximate thereto, said spring having a slot in said other of said legs extending in the direction of said other leg, said shaft having a first shoulder on one side and a second shoulder on the opposite side, said shaft inserted through said slot and into said knob, said spring mounted within said knob to be biased such that said first shoulder bears against the free end of said other leg and said second shoulder bears against the opposite end of said other leg, thereby locking said shaft within said knob.

---

This invention relates to a connecting apparatus. More particularly, this invention relates to a unique apparatus for connecting a control shaft to a control knob such as used on the instrument panel of an automobile.

One type of self-locking retainer clip has found particular acceptance for such uses. However, in order to use such clips, a notch of extremely small dimension must be milled into the shaft. An object of this invention is to utilize such a structure having a shaft much simpler to manufacture, the manufacture of the shaft requiring only a blank die, eliminating the necessity for a difficult and expensive milling operation. Further, the combined connecting apparatus utilizing the improved shaft eliminates looseness in the connection and allows automatic ejection of the shaft from the knob. Thus, the entire assembly is less expensive to manufacture and actually allows improved operation of the connecting apparatus.

These and other objects of this invention will become apparent to those skilled in the relevant arts upon reading the following specification in conjunction with the accompanying drawing, wherein.

Briefly, this invention relates to a connecting apparatus of the type having a knob, a generally L-shaped spring, one of the legs of the spring mounted within the knob and the other of the legs lying proximate the knob. The spring has a slot in the said other of the legs extending in the direction of the said other leg. A shaft having a first shoulder on one side and a second shoulder on the opposite side is insertable through the slot and into the knob. The spring is mounted within the knob to be biased such that the first shoulder bears against the free end of the said other leg and the second shoulder bears against the opposite end of the said other leg, thereby locking the shaft within the knob.

Figure 1:
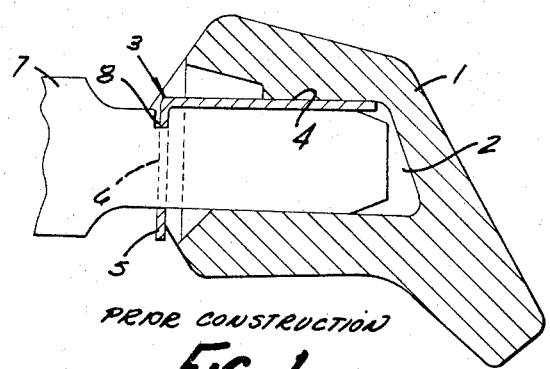
FIG. 1 is a side view, partially sectioned, showing the prior construction.
Figure 2:
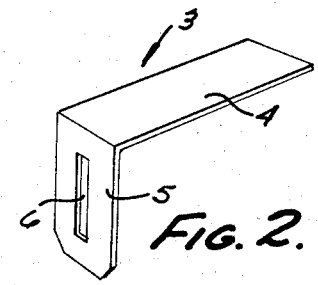
FIG. 2 is a perspective view of the spring utilized in this apparatus.

FIG. 1 shows the prior construction. A knob 1 is hollowed at 2 for reception of the spring 3 (shown in perspective view in FIG. 2) and the control shaft 7. The spring 3 is of generally L-shape including legs 4 and 5. The leg 4 of the spring 3 is mounted in the interior 2 of knob 1. A slot 6 is formed in leg 5. A shaft 7 of a size enabling it to be inserted through the slot 6 is provided, having a milled notch 8 therein. The leg 4 of the spring 3 is mounted within the knob 1 such that the leg 5 is free for spring movement, lying proximate the knob 1. The shaft 7 is inserted through the slot 6 and into the interior 2 of the knob 1. The spring 3 snaps into the notch 8, thereby spring-biasing the shaft within the knob. It should be understood that the size of the parts are greatly exaggerated in the drawing and as already stated hereinbefore, the notch 8 is extremely small. Although this connecting structure has found particular acceptance for use in areas such as securing shafts to knobs appearing on instrument panels and the like, the notch 8 requires a difficult and expensive milling operation and adds excessively to the cost of the apparatus.

Figure 3:
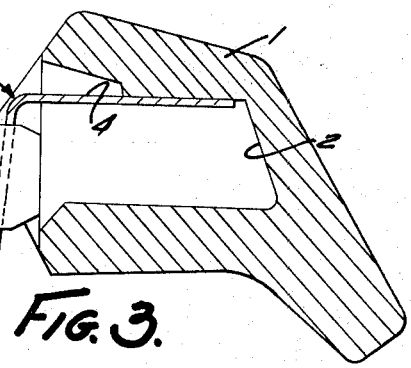
FIG. 3 is a side view, partially sectioned, showing the improved apparatus of this invention just as the shaft is being inserted into the knob.
Figure 4:
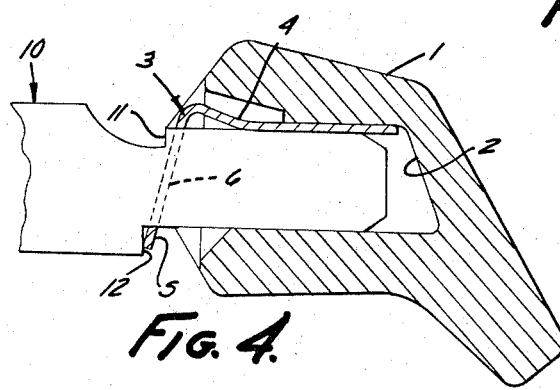
FIG. 4 is a view identical to FIG. 3, the shaft partially inserted into the knob.
Figure 5:
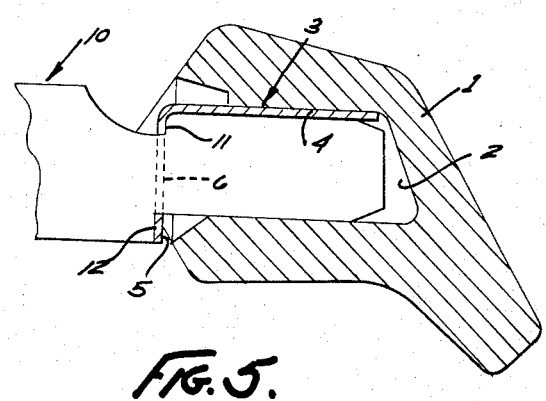
FIG. 5 is a view similar to FIG. 3, the shaft entirely inserted into the knob and secured therein.

The improved construction is shown in FIGS. 3-5. The knob 1 and spring 3 are similar to the knob and spring already described hereinbefore and bear corresponding reference numerals. In the improvement, the shaft 10 does not have a notch but includes an upper shoulder 11 and a lower shoulder 12. The shoulders 11 and 12 face each other and are offset approximately the width of the leg 5 of the spring 3.

With the improved construction, the apparatus operates as follows. As shown in FIG. 3, the slot 6 is of a size sufficient to receive the shaft 10. As the shaft 10 is inserted into the slot 6 in the leg 5 of the spring 3, it enters the interior 2 of the knob 1 as shown in FIG. 4. While so doing, the leg 4 of the spring 3 is mounted within the interior of the knob 1 such that the lower end of the leg 4 is biased upwardly as the shaft 10 enters the knob 1. This places the spring 3 under tension for reception of the shaft 10. When the shaft 10 is inserted into the knob 1 a sufficient distance, the lower shoulder 12 engages the outer free end of the leg 5 of the spring 3. As shown in FIG. 4, as the shaft 10 is inserted further into the knob 1, the free end of the leg 5 of spring 3 is biased by the shoulder 12 towards the knob 1. Turning to FIG. 5, when the shaft 10 is inserted further into the interior 2 of the knob 1, the end of leg 5 of spring 3 adjacent the bite portion thereof snaps over the shoulder 11. This firmly locks the shaft to the knob 1 under tension. The spring is biased such that the outer free end of leg 5 of spring 3 presses outwardly against shoulder 12 of shaft 10. The inner other end of leg 5 bears against shoulder 11 and prevents disengagement of the shaft from the knob. Since the interior of the knob 1 prevents movement of the end of the shaft 10, and the spring 3 exerts the forces on the shaft as described, looseness is eliminated and the knob is held very securely to the shaft. However, by merely pushing the free end of the leg 5 of the spring 3 upwardly from the position shown in FIG. 5, the leg 5 will snap from its engagement with shoulder 11 to the position shown in FIG. 4. When this happens, the shaft may be simply withdrawn from the spring 3 and the knob 1.

It will be seen that this invention has provided an improved means for connecting a shaft to a knob. Expensive milling operations have been eliminated and the shaft can actually be manufactured from a blank die. Looseness is eliminated, yet the shaft may be easily removed from the knob by simply pressing on the spring.

While only certain embodiments of this invention have been shown and described, it may be possible to practice the invention through the utilization of certain other embodiments without departing from the spirit and scope

I claim:

1. A connecting apparatus of the type having a knob, a generally L-shaped spring, one of said legs of said spring mounted within an opening in said knob and the other of said legs lying proximate said knob opening, said spring having a slot in said other of said legs extending in the direction of said other leg, the improvement comprising a shaft having adjacent one end thereof a first shoulder on one side facing toward said one end and a second shoulder on the opposite side facing away from said one end, said shaft extending through said slot and into said knob opening, while biasing said spring to its assembled position such that said shoulders engage opposite sides of said other leg to provide positive abutments on opposite sides of said shaft, with one of said shoulders preventing shaft movement in one direction and the other in another direction relative to said knob.

2. A connecting apparatus as defined in claim 1, said first shoulder bearing against the outer free end of said other leg on the side thereof away from the knob and said second shoulder bearing against the inner opposite end of said other leg on the other side thereof and adjacent its point of intersection with the other leg.

3. A connecting apparatus as defined in claim 1, said shoulders being spaced laterally and facing in opposite directions and offset axially approximately the width of said other leg of said spring.

4. A connecting apparatus as defined in claim 1, said first shoulder bearing against the outer free end of said other leg and said second shoulder bearing against the inner opposite end of said other leg, said shoulders facing each other and offset approximately the width of said other leg of said spring.

References Cited

2,801,118 7/1957 Amesbury.

ANDREW KUNDRAT, *Assistant Examiner*.

UNITED STATES PATENTS 2,180,929 11/1939 Murphy.
2,643,903 6/1953 Nathan.

FOREIGN PATENTS 903,175 8/1962 Great Britain.

CARL W. TOMLIN, *Primary Examiner*.